United States Patent [19]

Morisawa

[11] Patent Number: 5,059,991

[45] Date of Patent: Oct. 22, 1991

[54] DUSTPROOF TRANSPARENT MEMBER

[75] Inventor: Satoru Morisawa, Tokyo, Japan

[73] Assignee: Asahi Kogaku Kogyo Kabushiki Kaisha, Tokyo, Japan

[21] Appl. No.: 545,119

[22] Filed: Jun. 29, 1990

Related U.S. Application Data

[63] Continuation of Ser. No. 426,028, Oct. 24, 1989, abandoned.

[30] Foreign Application Priority Data

Oct. 28, 1988 [JP] Japan ............................ 63-141417[U]

[51] Int. Cl.⁵ ...................... G01D 15/14; G03G 21/00
[52] U.S. Cl. ..................................... 346/160; 355/215
[58] Field of Search .................... 346/153.1, 155, 160, 346/108; 250/235; 354/64; 355/215

[56] References Cited

U.S. PATENT DOCUMENTS

| | | | |
|---|---|---|---|
| 4,560,999 | 12/1985 | Tokuhara | 346/160 |
| 4,723,150 | 2/1988 | Lutus et al. | 355/215 |
| 4,823,002 | 4/1989 | Saito | 346/108 X |
| 4,837,598 | 6/1989 | Nonami | 355/218 |
| 4,970,552 | 11/1990 | Okamoto et al. | 355/215 |

OTHER PUBLICATIONS

German Offial Action with partial translation.

*Primary Examiner*—Donald A. Griffin
*Attorney, Agent, or Firm*—Sandler, Greenblum & Bernstein

[57] ABSTRACT

A dustproof transparent member is fitted to a window in an optical system container of e.g. an optical scanning unit in a laser beam printer. On the surface of the dustproof transparent member, a layer of transparent conductive material is formed.

The body of the printer and the dustproof transparent member are electrically connected to make their electric potentials equal, thereby preventing floating substances in the atmosphere from electrostatically sticking to the dustproof transparent member.

12 Claims, 2 Drawing Sheets

DUSTPROOF TRANSPARENT MEMBER

This application is a continuation of application Ser. No. 07/426,028, filed Oct. 24, 1989 and now abandoned.

BACKGROUND OF THE INVENTION

The present invention relates to a dustproof transparent member fitted to a window of a container for containing an optical system or the like.

Laser printers are increasingly being used for obtaining hard copies of image data on recording paper and particularly small-sized, inexpensive printers utilizing semiconductor lasers have increasingly been put to practical use. The laser printer is designed to obtain such hard copies by first exposing a photoconductive drum charged with electricity to a laser beam modulated according to image data such as diagrams and characters, scanning the surface of the photoconductive drum to form an electrostatic latent image, and then subjecting the latent image to a copying process (i.e. the copying process of the so-called electrophotographic system) comprising the steps of developing (i.e. converting the latent image into a toner image), transferring and fixing the image.

In such an image processing apparatus utilizing electrophotographic system as the laser printer, an optical system is normally contained in an independent container in the form of a unit and luminous flux of, e.g. a laser beam 1 is emitted through a window fitted to the container. The window of the container is covered with a dustproof transparent member such as transparent glass, so that toner and other kinds of dust floating in the apparatus are prevented from penetrating into the optical system and sticking to optical parts.

However, because a charger or transfer charger is corona-discharged at high voltages in the image processing apparatus utilizing electrophotography, the dustproof transparent member of the aforementioned container may be charged and consequently the dustproof transparent member may also electrostatically adsorb the dust such as toner floating therein. The problem is that the dust causes the scattering of the luminous flux and a decrease in its transmittance.

Moreover, the toner itself floating in the apparatus often becomes charged and therefore tends to stick to the various parts. As a result, the charged toner may inconveniently stick to the dustproof transparent member of the container even when the dustproof transparent member is not charged.

SUMMARY OF THE INVENTION

It is therefore an object of the invention to provide a dustproof transparent member capable of preventing floating substances such as dust in the atmosphere from electrostatically sticking thereto.

In order to accomplish the object of the invention, a dustproof transparent member for use in covering an opening of an optical system contained in an optical system container installed in a specific apparatus, comprises: a transparent member; a layer of transparent conductive material formed on the surface of the transparent member; and a potential control means for setting the electric potential of the body of the specific apparatus and that of the layer of transparent conductive material at the same potential.

DESCRIPTION OF THE ACCOMPANYING DRAWINGS

FIG. 1 is a schematic side view illustrating a laser printer equipped with a dustproof transparent member embodying the present invention; and FIG. 2 is an enlarged sectional view of the periphery of a window 41a formed in a container 41.

DESCRIPTION OF THE EMBODIMENT

Figure 1:
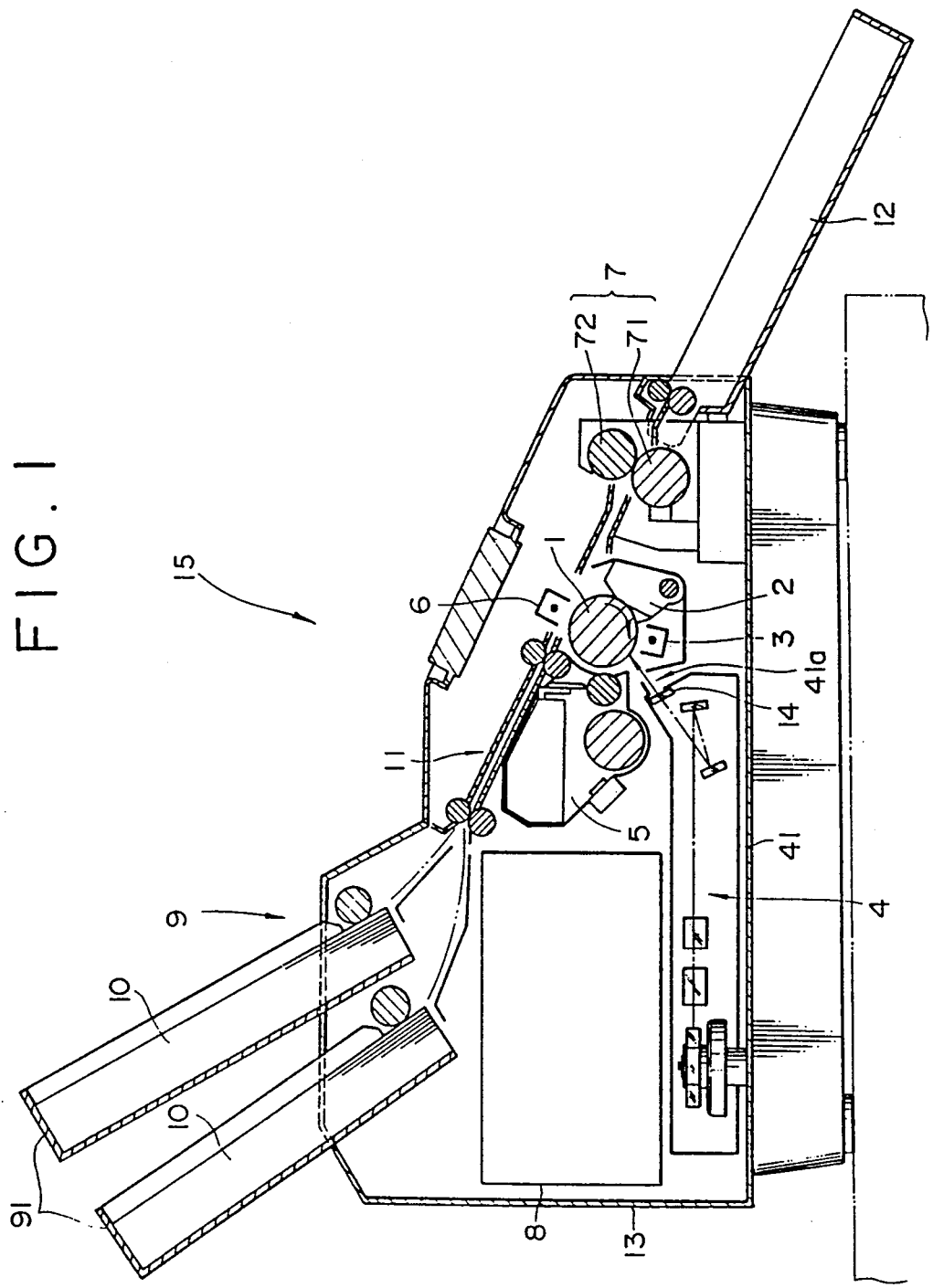

FIG. 1 is a schematic side view of a laser printer 15 having a dustproof transparent member embodying present invention.

This laser printer 15 is designed to print data received from a host computer on recording paper 10 conveyed through the top flat portion of a printer body 13 by electrophotographing and discharging the paper from the lower side face of the body 13.

The body 13 is shaped as a substantially rectangular parallelepiped with its surface on one side diagonally cut and sheets of recording paper 10 are contained in recording paper cassettes 91, which are fitted to a cassette holding portion 9 in the top flat portion of the body 13. In this case, a plurality of recording paper cassettes 91 are fitted into the recording paper holder 9, so that a plurality of sheets of recording paper 10 different in size can be provided.

The recording paper 10 is conveyed from the cassette holding portion 9 along a paper feed path 11 and discharged onto a discharge paper tray 12 arranged on the lower side face of the body 13.

An electrophotographic processing unit is provided with a photoconductive drum 1 disposed under the paper feed path 11 to form a so-called facedown system in which an image is transferred (fixed) to the undersurface of the recording paper 10.

More specifically, around the photoconductive drum 1 on the body 13 side, the following units are disposed along the direction of its rotation in the order described below: a cleaning unit 2 for removing toner remaining on the surface of the photoconductive drum 1, a charging unit 3 for uniformly charging the surface of the photoconductive drum 1, a laser scanning unit 4 for introducing a laser beam which is on/off modulated according to input data onto the photoconductive drum 1, a developing unit 5 for making toner stick onto a latent image formed on the photoconductive drum 1 by the laser beam and converting the latent image to a toner image, a transfer unit 6 for transferring the toner image on the photoconductive drum 1 onto the recording paper 10, and a fixing unit 7 disposed properly on the passageway of the recording paper 10 in front of the paper tray 12.

The fixing unit 7 consists of a pair of rollers: a heat roller 71 and a backup roller 72. The recording paper 10 is held between the pair of opposing rollers and the heat roller 71 is employed to heat and fix the toner image. The heat roller 71 is driven to rotate by a drive means (not shown) in order to feed the recording paper 10. The circumferential speed of the heat roller is controlled synchronously with that of the photoconductive drum 1 by a control unit 8 for controlling the operation of each unit of the laser printer.

The laser beam from the laser scanning unit 4 is applied to the photoconductive drum 1 to scan its surface in the longitudinal direction (main scanning). While the main scanning is repeated, the photoconductive drum 1 is rotated in direction of the arrow in FIG. 1 and its surface is also scanned in the opposite direction (sub-scanning). A latent image is formed by the laser beam on the surface of the photoconductive drum 1 and the latent image is developed by the developing unit 5 into a toner image. In other words, the so-called electrophotographic system is implemented to form the latent image and to convert the latent image to the toner image. The toner image is then transferred from the surface of the photoconductive drum 1 to the undersurface of the recording paper 10; the toner image is transferred to the recording paper 10 before being discharged onto the paper tray 12 in facedown form. Prior to the scanning of the surface of the photoconductive drum 1 (the formation of the latent image), residual toner in the preceding process is removed by the toner cleaning unit 2 and the whole surface thereof is charged by the charging unit 3. The laser scanning unit 4 comprising optical elements including a semiconductor laser for generating a laser beam and a polygon mirror for reflecting the laser beam is contained in a container 41 as a unit and the laser beam is emitted through a window 41a formed in the container 41 to the photoconductive drum 1.

Figure 2:
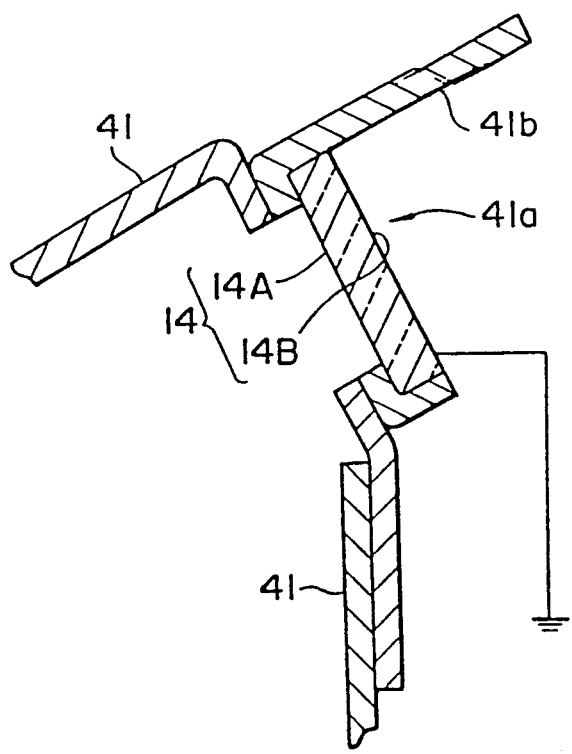

FIG. 2 is an enlarged sectional view of the periphery of the window 41a formed in the container 41.

The container 41 is provided with the rectangular window 41a in parallel to the longitudinal direction of the photoconductive drum 1 and rectangular dustproof glass 14 is fitted to the window 41a, whereby the optical system in the container is completely sealed for dustproofing purposes. Moreover, a projection 41b is formed in the upper portion of the window 41a so as to prevent floating substances such as toner leaking out of the developing unit 5 disposed above the container 41 from directly falling on the window 41a.

The dustproof glass 14 is so-called conductive transparent glass prepared by coating a transparent substrate 14A made of soda glass with conductive material such as tin oxide ($SnO_2$), indium oxide ($In_2O$) or the like to form a transparent conductive film 14B by means of a hot press or vacuum deposition. The transparent conductive film 14B side is made to abut against the window 41a and tightly fitted thereto. The transparent conductive film 14B side is electrically connected to the body 13 (grounded) to set the potential of the transparent conductive film 14B, i.e. the surface potential of the dustproof glass 14 equal to that of the body 13, i.e. the ground potential.

More specifically, since the surface potential of the dustproof glass 14 is made equal to the ground potential with this arrangement, floating substances such as dust, particularly the charged toner leaking out of the developing unit 5 are not electrostatically adsorbed and therefore dust is prevented from sticking to the surface of the dustproof glass 14.

Although a description has been given of a case where the dustproof glass is fitted to the window 41a through which the laser beam is emitted in the embodiment shown, the present invention is not limited to that application but also applicable to a dustproof cover formed with a transparent member made of material other than glass.

As set forth above, the transparent conductive film is formed on the surface of the dustproof transparent member and the transparent conductive film is grounded so as to set the surface thereof and the printer body at the same potential, whereby floating substances such as dust in the atmosphere are prevented from electrostatically sticking to (adsorption) the surface of the dustproof glass.

What is claimed is:

1. A dustproof transparent member for use in covering an opening of an optical system container installed in an apparatus and positioned beneath a developing unit, which comprises:
    a transparent member, said transparent member positioned so that dust or toner particles, which may fall from the developing unit, are shed away from said optical system;
    a layer of transparent conductive material formed on the surface of said transparent member; and
    potential control means for setting the electric potential of the body of said apparatus and that of said layer of transparent conductive material at the same potential.

2. The dustproof transparent member according to claim 1, wherein said potential control means comprises a connection member for electrically connecting said layer of transparent conductive material to said apparatus body.

3. The dustproof transparent member according to claim 1, wherein said apparatus is an imaging apparatus employing an electrophotographic system.

4. The dustproof transparent member according to claim 3, wherein said imaging apparatus is a laser beam printer comprising a photoconductive drum disposed under a recording sheet feed path so that an image is transferred to the undersurface of a recording sheet; and wherein said optical system container is an optical scanning unit disposed under said recording sheet feed path to emit a laser beam toward a circumferential surface of said photoconductive drum.

5. The dustproof transparent member according to claim 1, wherein said transparent conductive material is selected from a group of tin oxide and indium oxide.

6. A laser beam printer comprising a body frame and a laser scanning unit housed in said body frame and having an opening positioned beneath a developing unit, through which a laser beam is emitted outwardly; wherein said opening is covered by a transparent member positioned so as to shed dust or toner particles, which may fall from the developing unit, away from said laser scanning unit, the surface of said transparent member having a layer of transparent conductive material; and wherein said layer of transparent conductive material and said body frame are electrically connected to make their electrical potential equal.

7. A dustproof transparent member for use in covering the opening of an optical system container positioned beneath a developing unit installed in an apparatus having a body, which comprises:
    a transparent member, said transparent member being conductive and positioned so that dust or toner particles, which may fall from the developing unit, are shed away from said optical system container; and
    potential control means for setting the electric potential of the body of said apparatus and the electric potential of said transparent member to be equal to each other.

8. The dustproof transparent member according to claim 7, wherein said potential control means comprises a connection member for electrically connecting said transparent member to said apparatus body.

9. The dustproof transparent member according to claim 7, wherein said apparatus is an imaging apparatus employing an electrophotographic system.

10. The dustproof transparent member according to claim 9, wherein said imaging apparatus is a laser beam printer comprising a photoconductive drum disposed beneath a recording sheet feed path so that an image is transferred to the undersurface of a recording sheet; and wherein said optical system container is an optical scanning system disposed under said recording sheet feed path to emit a laser beam towards a circumferential surface of said photoconductive drum.

11. The dustproof transparent member according to claim 7, wherein said transparent member includes a conductive material selected from a group of tin oxide and indium oxide.

12. A laser beam printer comprising a body frame and a laser scanning unit housing said body frame and having an opening positioned beneath a developing unit, through which a laser beam is emitted outwardly; wherein said opening is covered by a transparent member, said transparent member being conductive and being positioned so as to shed dust or toner particles, which may fall from the developing unit, away from said laser scanning unit; and wherein said transparent member and said body frame are electrically connected to make their electric potentials equal.

* * * * *

UNITED STATES PATENT AND TRADEMARK OFFICE
CERTIFICATE OF CORRECTION

PATENT NO. : 5,059,991

DATED : October 22, 1991

INVENTOR(S) : Satoru MORISAWA

It is certified that error appears in the above-indentified patent and that said Letters Patent is hereby corrected as shown below:

On the cover page at section [56], insert ---0200452  11/1986  E.P.O--- under "Foreign Patent Documents".

Signed and Sealed this

Eighteenth Day of April, 1995

Attest:

BRUCE LEHMAN

*Attesting Officer*  *Commissioner of Patents and Trademarks*